(12) United States Patent  (10) Patent No.:  US 7,593,125 B2
Wang et al.  (45) Date of Patent:  Sep. 22, 2009

(54) PRINT JOB SPOOLING AND DISTRIBUTION SYSTEM

(75) Inventors: Zhencai Wang, Concord, CA (US); Lu-Chun Liao, Walnut Creek, CA (US); Katherine B. Lao, Concord, CA (US); Hong Yan, San Ramon, CA (US)

(73) Assignees: Kyocera Mita Corporation, Osaka (JP); Kyocera Technology Development, Inc., Concord, CA (US)

( * ) Notice: Subject to any disclaimer, the term of this patent is extended or adjusted under 35 U.S.C. 154(b) by 821 days.

(21) Appl. No.: 11/123,574

(22) Filed: May 6, 2005

(65) Prior Publication Data

US 2006/0250638 A1  Nov. 9, 2006

(51) Int. Cl.
*G06F 15/00* (2006.01)
*G06F 15/173* (2006.01)

(52) U.S. Cl. ...................................... 358/1.15; 709/224
(58) Field of Classification Search ................ 358/1.15, 358/1.13, 1.14, 1.18, 401; 709/200, 203, 709/216, 220, 222, 219, 224, 223, 228, 229; 710/1, 7, 8, 5, 14, 15, 16, 38, 200; 715/209
See application file for complete search history.

(56) References Cited

U.S. PATENT DOCUMENTS

| 6,075,615 | A | * | 6/2000 | Nakamura | ................. 358/1.14 |
| 6,542,252 | B2 | | 4/2003 | Brossman | |
| 6,552,813 | B2 | | 4/2003 | Yacoub | |
| 6,567,184 | B2 | | 5/2003 | Aoki | |
| 6,616,359 | B1 | | 9/2003 | Nakagiri | |
| 6,658,498 | B1 | * | 12/2003 | Carney et al. | ................... 710/8 |
| 6,717,693 | B2 | | 4/2004 | Mitsuhashi | |
| 6,760,118 | B1 | | 7/2004 | Kato | |
| 6,798,530 | B1 | | 9/2004 | Buckley | |
| 6,804,022 | B2 | | 10/2004 | Fujiwara | |
| 6,842,263 | B1 | | 1/2005 | Saeki | |
| 2003/0184799 | A1 | | 10/2003 | Ferlitsch | |
| 2004/0136023 | A1 | | 7/2004 | Sato | |
| 2004/0257604 | A1 | | 12/2004 | Morooka | |

FOREIGN PATENT DOCUMENTS

JP    2001337805    12/2001

* cited by examiner

*Primary Examiner*—Saeid Ebrahimi Dehkordy

(57) ABSTRACT

Method for efficient printing of large-volume documents to multiple printers, comprising GUI for administrators to configure a virtual port associated with physical and virtual printers; print job to a virtual printer spooled to the associated virtual port; and administrators sending spooled print job to the associated physical printers. Options include Spool without printing, Spool and print immediately, and Spool and print at a scheduled time. Printing policies include Tandem (the same copies to printers), Direct (to one printer), Broadcast (specified copies to printers), and Cluster (a print job is divided into pieces at page boundaries). Cluster dividing subpolicies match color, paper size, media type, and finishing characteristics of the pieces with the printer characteristics, and sending subpolicies optimize based on printer speeds and distribute equal number of pages. Bidirectional communication and monitoring using SNMP and PJL enable Pool (the first available printer) and Recovery (job transfer after a failure) printing policies. Methods also include job previewing and accounting.

17 Claims, 9 Drawing Sheets

07/11/2003 12:12:15 [00000081]   Log File Created.

07/11/2003 12:12:58 [00082001] Pages:1  Owner: "Zhencai"    Job Printed.
Job file name: "C:\Program Files\KM\SpoolCenter\Spool\dev\Test Page_001.ps"

07/11/2003 12:14:08 [00084001] Pages:1  Owner: "Zhencai"    Job Hold.
Job file name: "C:\Program Files\KM\SpoolCenter\Spool\dev\Test Page.ps"

07/11/2003 12:14:08 [00084001] Pages:1  Owner: "Zhencai"    Job Hold.
Job file name: "C:\Program Files\KM\SpoolCenter\Spool\dev\Test Page_001.ps"

07/11/2003 15:54:27 [00088001] Pages:1  Owner: "Zhencai"    Job Scheduled.
Job file name: "C:\Program Files\KM\SpoolCenter\Spool\dev\Test Page_009.ps"

07/11/2003 16:57:50 [00000201] Name: "dev"    Queue Configured.
    Queue spool option: 0x1000007f4dc4cd4e
    Queue spool path: "C:\Program Files\KM\SpoolCenter\Spool\dev\"
    Queue printer [0]: "KM FS-1000+ KX"

07/15/2003 10:58:04 [00082001] Pages:1  Owner: "Zhencai"    Job Printed.
Job file name: "C:\Program Files\KM\SpoolCenter\Spool\dev\Test Page_002.ps"

07/15/2003 10:58:04 [00082001] Pages:1  Owner: "Zhencai"    Job Printed.
Job file name: "C:\Program Files\KM\SpoolCenter\Spool\dev\Test Page_003.ps"

07/15/2003 10:58:53 [00001001] Pages:1  Owner: "Zhencai"    Job Added.
Job file name: "C:\Program Files\KM\SpoolCenter\Spool\dev\Test Page_008.ps"

07/17/2003 18:00:10 [00000201] Name: "dev"    Queue Configured.
    Queue spool option: 0x2000007f4dc4cd4e
    Queue spool path: "C:\Program Files\KM\SpoolCenter\Spool\dev\"
    Queue printer [0]: "KM FS-1000+ KX"

FIG. 3

| 1010 | Administrator uses GUI to configure a VPort, each associated with physical printers and virtual printers. (A virtual printer is configured from a physical printer.) |

| 1020 | A job sent to a virtual printer is spooled to the VPort associated with the virtual printer. (Spool without printing,  Spool and print immediately,  Spool and print at a scheduled time) |

| 1030 | Administrator uses GUI to send the spooled print job to the physical printer(s) associated with the VPort. |

Cluster printing policy comprises:

--- dividing a print job into pieces at page boundaries by applying dividing subpolicies of matching color, paper size, media type, finishing characteristics of the pieces with the corresponding characteristics of the physical printers
(where the order of the application of the dividing subpolicies is customizable by an administrator)

--- sending the pieces to the physical printers by applying sending subpolicies of optimization for fastest printing based on physical printers' speeds, and/or equal-page distribution.

FIG. 10

| 1110 | Bidirectional communication to the physical printer(s) to monitor status of a network printer through SNMP and to monitor status of a local printer through PJL commands; |
| --- | --- |
| | Administrator uses GUI to send a print job to physical printer(s) associated with the VPort using |
| | Pool printing policy (sent to the first available and functional printer); |
| | Recovery printing policy (after a printing failure of a job, the job is transferred to an available and functional printer). |

| 1120 | User can use GUI to select print job(s) from the print jobs spooled to a VPort, and enable Zoom-in and Zoom-out preview of the selected job(s) in separate window(s). |
| --- | --- |

| 1130 | User can use GUI to select a VPort and display accounting information comprising general accounting information about status, the number of jobs, number of pages of the print jobs spooled to the VPort, and by-date and by-time accounting information. |
| --- | --- |

FIG. 11

PRINT JOB SPOOLING AND DISTRIBUTION SYSTEM

CROSS-REFERENCES TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to the field of printing systems, and more particularly to providing methods for simultaneous and efficient printing of large-volume documents to multiple printers.

BACKGROUND OF THE INVENTION

Device drivers are generally known, including a printer driver. Typically, printing from a computer occurs through the use of a printer driver. Upon either an application launch or during a print command load time, the application will call an instance of the printer driver. In a large company, where large-volume documents are printed, there is a need for a simultaneous and efficient printing of large-volume documents to multiple printers. Reduction in time and cost can be achieved by resource sharing and load balancing when printing to multiple printers. The present invention arose out of the above concerns associated with providing an improved method of print accounting.

SUMMARY OF THE INVENTION

Methods, computer program products, computing and printing systems for simultaneous and efficient printing of large-volume documents to multiple printers are described. The present invention includes a server-side application system for users to print large-volume documents among multiple printers simultaneously and efficiently. It enables users to capture, preview and then redistribute print jobs according to various pre-defined and user-customized printing policies. The administrator can use an embodiment of the present invention to get the statistic information of job printings in a large organization. As a major part of Document Solution, the present invention will work with the printer driver and Post Processor to provide users enhanced ways of handling print jobs. Embodiments of the present invention are designed for Windows NT4, Windows 2000 and Windows XP operating systems.

The present invention consists of four parts: Job Spooler, Job Capturer (VPort or virtual port), Job Distributor, and SpoolCenter Printer Configuration. A computer system embodiment of the present invention is referred to as Spool-Center.

Job Spooler provides users an integrated UI to manage jobs, set print policies for the job to print, configure print queue, manually print jobs to print queue and create Spool-Center printers. Job Spooler of the present invention enables the following functions: Preview job: zoom-in, zoom-out preview; Reprint job; Delete job; Hold job; Copy/Cut/Paste job; and Job accounting.

Job Capturer (VPort) would capture any Driver output and save the output to the specified spool folder. The print policy of VPort (virtual port) will be copied as the print policy of the jobs. According to the print options of the VPort, the jobs will be hold, scheduled or printed immediately. Job Capturer of the present invention enables Add/Configure/Delete VPort, and Capture and save jobs.

Job Distributor, according to the redistribution rules pre-defined by users, will split the print job into multiple print jobs according to job configuration, features and requirement for printer device, and will manually or automatically distribute jobs to multiple devices. Job Distributor of the present invention enables the following functions: (1) Direct Printing: Directly send the job to a specific printer. (2) Tandem Printing: Print multiple copies to multiple devices. If the application sends X copies of the job to SpoolCenter and the VPort has Y printers, then SpoolCenter will print X/Y copies of the job to each printer. (3) Broadcast Printing: Multiple the job sent from application and sent to the printer specified. (4) Cluster Printing: Cut the job from application into small pieces at page boundaries according to the settings and send each print one piece. (5) Time-scheduled Printing: Print jobs at the scheduled time. (6) Pool Printing: Print the job to the first available device in the queue. (7) Distribution Logs. (8) Notification to the clients.

SpoolCenter Printer Configuration is a utility to create SpoolCenter printer with a VPort according to the existing printers. The default PDL of the SpoolCenter printer will be set to KPDL.

In a big company, millions of copies of documents, such as bills or statements, are required to be printed. It could take very long time to complete. SpoolCenter can make full use of the devices on hand, split the documents and send them to multiple printers to complete the printing as soon as possible. The benefits of the SpoolCenter include: Resources sharing: making full use of the printers on hand and improve their efficiency; No blocking: balance the loads among the printers; Speed: reduce the time of printing; and Economy: reduce the costs to buy more printers.

The invention will be more fully understood upon consideration of the detailed description below, taken together with the accompanying drawings.

DESCRIPTION OF THE DRAWINGS

FIG. 3 is a sample log file, in accordance with a preferred embodiment of the present invention.

FIG. 10 is a flowchart showing overall SpoolCenter and VPort processing, in accordance with a preferred embodiment of the present invention.

FIG. 11 is a block diagram showing additional SpoolCenter and VPort features, in accordance with a preferred embodiment of the present invention.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
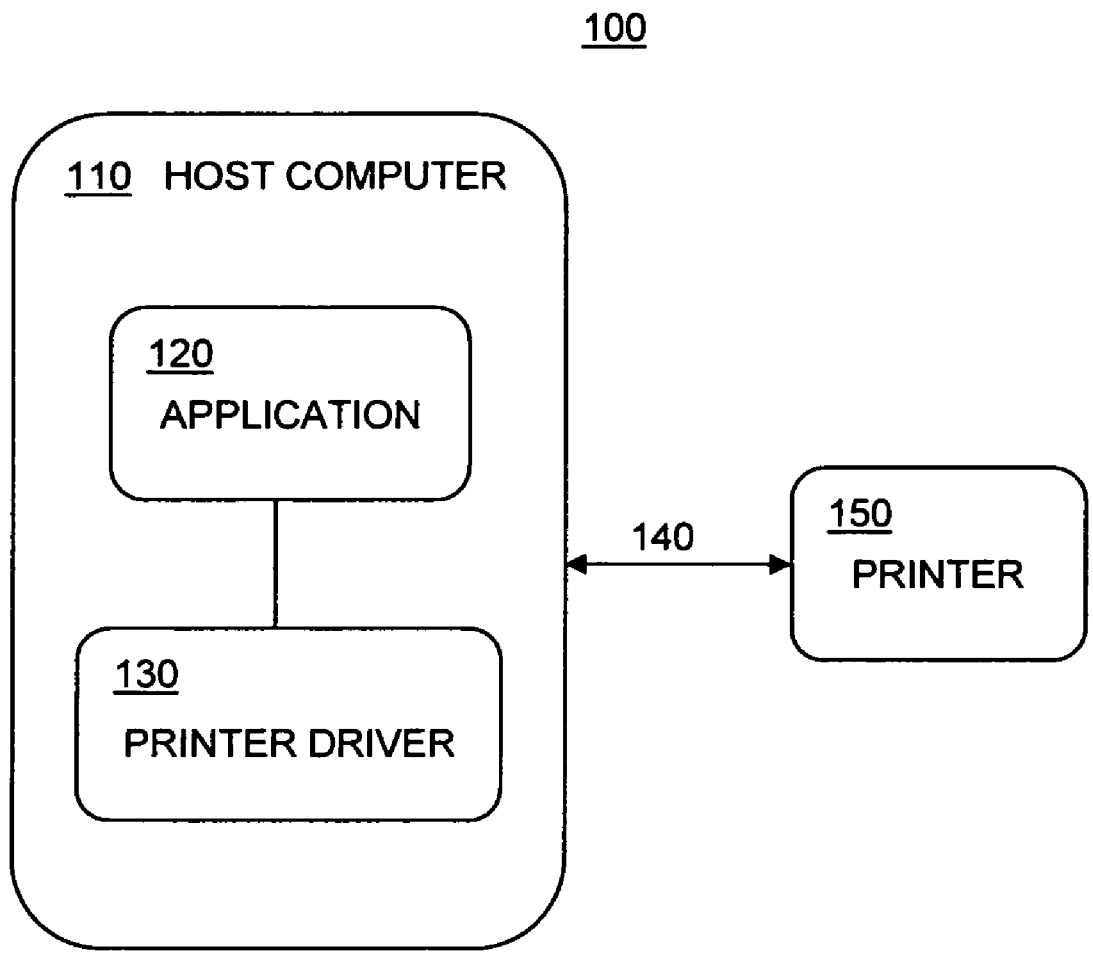
FIG. 1 is a simplified block diagram showing connection of a computing system to a printer.

FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer driver settings, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver settings, but they are to be understood as similarly applicable to other kinds of device drivers.

The present invention consists of four parts: Job Spooler, Job Capturer (VPort or virtual port), Job Distributor, and SpoolCenter Printer Configuration. A computer system embodiment of the present invention is referred to as SpoolCenter. The SpoolCenter Printer Configuration is a utility to create a SpoolCenter printer with a VPort basing on the existing driver. A SpoolCenter printer is used to capture the jobs from the application. When users print documents from the application to the SpoolCenter printer, the raw printed data rendered by the driver will be captured, saved and sent to SpoolCenter. After the SpoolCenter printer is created, the PDL of the printer will be automatically set to KPDL. The SpoolCenter Printer created by the utility will use the default settings of the driver, not the setting of the printer based on. If the same settings are required, users have to go to the SpoolCenter printer properties to change them. The main features of the SpoolCenter Printer Configuration are as follows: Create the printer automatically. Integrate VPort operations. Associate the printer with the SpoolCenter VPort. Set default PDL to KPDL automatically for driver. The main benefits of the SpoolCenter Printer Configuration are as follows: (1) Easy to create a virtual printer. Build a connection between SpoolCenter and VPort and integrate the whole product; and (2) Simplify the interface to use SpoolCenter. All users will do is just to print the documents from applications to the virtual printers.

The VPort Monitor (Job Capturer) in essence is a printer port monitor installed under system Spooler and used by SpoolCenter to capture and forward print job. When a VPort is set as the port used by some printer, all print jobs printed to this printer will be forwarded to VPort monitor. The job raw data will be captured and saved to a pre-specified spool folder. According to the print options and print policy of the port, the print job might be either printed immediately, or hold temporarily, or printed at scheduled time from Spool Center.

While the spooled raw data is saved to .PS, .PCL, .XL, .SPL, .SMF, .PDF, .GDI files in the spool folder according to the raw data type, a configuration file .CFG for the job will be created also under the spool folder. Inside .CFG file there are some document information and job information which will be used by SpoolCenter. Each action of each port (also we call it Queue in SpoolCenter) of the port monitor will be logged into a file for accounting and trouble-shouting purposes.

The main features of VPort Monitor are as follows: Any RAW data printer driver supported including driver. Spooling print jobs to different folders. Multiple spool option supported. Forwarding spooled jobs to multiple printers. All actions of the port being logged. Flexible design for extension. Seamless communication between the monitor and SpoolCenter and PostProcessor. Be able to run on Server without any intervention. The main benefits of the VPort Monitor are as follows: (1) Capture and save print jobs. The printed jobs will be captured and saved to PS file for later use. (2) Forward print jobs to multiple printers. The spooled job can be forwarded to multiple printers according to the port setting. (3) Log all actions of print jobs for analysis. The monitor provides a tool for administrator to manage and analyze the jobs. (4) Share print jobs with SpoolCenter and PostProcessor. All print jobs captured can be shared with SpoolCenter and PostProcessor through message passing among them.

Figure 2:
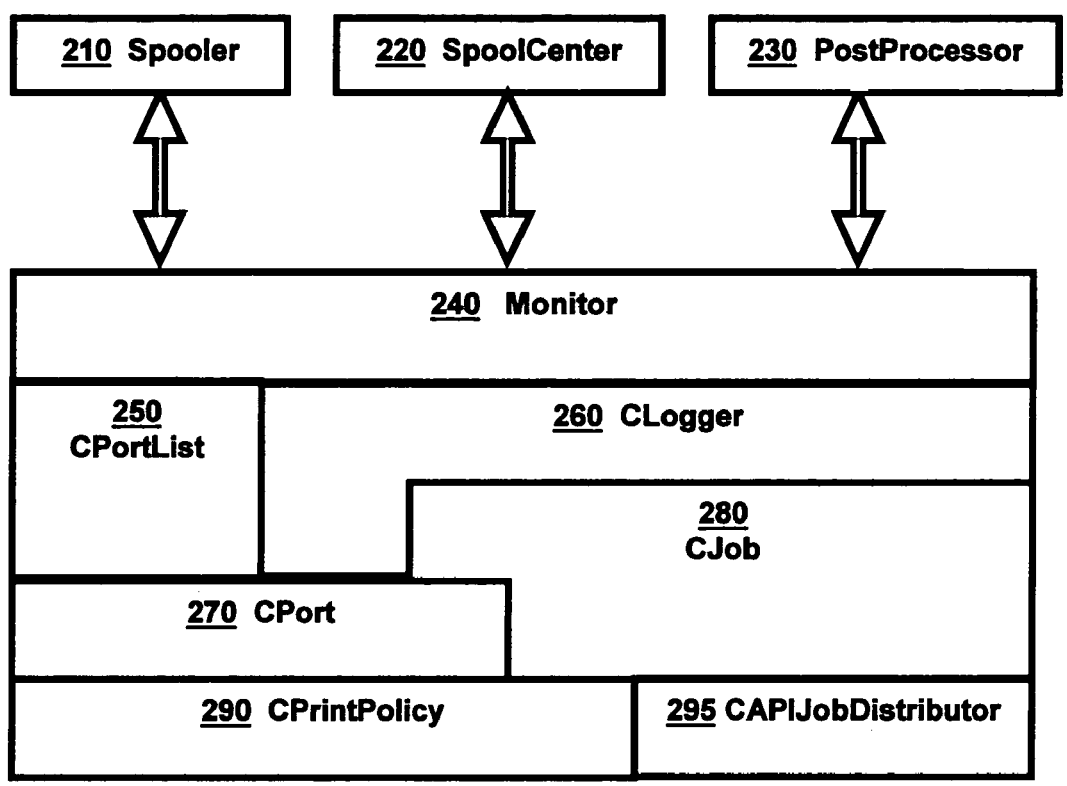
FIG. 2 is a block diagram showing the VPort Monitor Core Architecture, in accordance with a preferred embodiment of the present invention.

FIG. 2 is a block diagram showing the VPort Monitor Core Architecture, in accordance with a preferred embodiment of the present invention. VPort Monitor Core is a set of classes, which are responsible to manipulate the port and job information, write log, communicate and exchange data with Spooler 210, SpoolCenter 220, and PostProcessor 230. The class set has multiple layers, upper layers call lower layers' functions or use the information provided by the lower layers. There is no inheritance relationship between any two classes in the set. The classes except Monitor are also shared by SpoolCenter and PostProcessor. Any change of these classes will have some effects on SpoolCenter and PostProcessor.

CPrintPolicy class 290 is a class to indicate how to distribute and print the job. In an embodiment of the present invention, there are Cluster printing, Tandem Printing, Broadcast Printing and Direct Printing policies. Each policy has more detailed configuration. CAPIJobDistributor class 295 is a class to distribute and print the jobs according to the print policy. CPort class 270 is a class to save all information a SpoolCenter port needs. There is a printer list in the class to save all printer names to which the print jobs will be forwarded. Also there is some information that is used only by Monitor. CJob class 280 is a class to manipulate job information, including loading and saving job information, sending jobs to printers. The job document configuration file is created, read, written in this class. Obviously this class use CPort information. The print job is based on the VPort (Queue). Each queue could have multiple print jobs. CPortList class 250 is a class to manipulate a list of VPort, including creating, configuring, deleting a port from the port list, loading and save port information to the registry, finding a port and enumerating all ports. This class is the main class of port monitor core. CLogger class 260 is a class to write all transactions to a log file for trouble-shooting, analyzing and accounting. The class defines all transaction codes and their descriptions. Monitor 240 is actually not a class, but an interface with Spooler. It defines all APIs Spooler requires to be a standard port monitor, including adding, deleting, configuring, opening, reading, writing, enumerating port.

The port information saved to the registry includes SpoolPath, SpoolOption, Print Policy and ClusterPrinters. SpoolPath is an absolute path to save the spool files. ClusterPrinters is a null-terminated string that specifies the printers the port will forward the jobs to. Each printer name in the string is also terminated with a null (for example, "Kyocera Mita FS-1000+KX\Kyocera Mita FS-1800 KX\0\0"). SpoolOption is a DDWORD, 64-bit number.

FIG. 3 is a sample log file, in accordance with a preferred embodiment of the present invention. All operations applied to the port will be written to a log file for trouble shooting, analyzing and accounting. The log file name is SpoolCenter.log, which is located in the spool folder of the port. Each port has a log file. The information in the log file includes date and time the operation happens, operation code, and other information for different categories: Log file: an operation comment; Queue: name, spool path, spool options, cluster printers, and an operation comment; and Job: own name, number of pages, job file full path, and an operation comment. If the number of pages is −1, which means the page number is not available.

Communications between SpoolCenter, PostProcessor, and Job Distributor are described below. When the port monitor captures a job, it will send messages to SpoolCenter and PostProcessor to inform them a new job is spooled if they are started. Also when a port is added, configured or deleted from Spooler, the port monitor will also send messages to SpoolCenter to inform it the port information is changed. After editing the configuration, PostProcessor can send the job to a printer with a SpoolCenter port. PostProcessor will send a message to SpoolCenter to acknowledge the new job added. Message information includes command, port name, file name if available. If the message is for queue, only command and port name are valid. If the message is for job, all three of them are valid. There is another type of message from Job Distributor to SpoolCenter. When a job will be distributed and printed, SpoolCenter will load Job distributor. And Job Distributor will create a thread to process the job distribution and printing. After the thread finishes the printing, the Job Distributor thread will send WM_PRINT_STATUS message to SpoolCenter to notify the status of the job distribution and printing. The status could be printed successfully or failed. If failed, an error code will be included in the message.

Aspects of the UI (User Interface) of the present invention are described below. In a preferred embodiment of the present invention, VPort Monitor can only be loaded and called through system spooler. So the UIs can only be shown up when spool APIs AddPort( ), ConfigurePort( ) and DeletePort( ) are called. Generally they show up when users add, configure and delete port on the Properties UI of an installed printer. SpoolCenter also have the functionalities to add, configure and delete a VPort.

The GUI for adding a port according to an embodiment of the present invention is described below. We use the wizard UI style to guide use to create a VPort step by step. In each step, one or more information about the port is collected. After all information required to create a port are collected, at the last step, a new VPort will be created. The Page Navigation of adding port wizard gives a brief overview how the pages go back or forward upon different current situation. All pages can go bi-directionally on all Operating Systems.

After VPort monitor is installed and selected, after users click 'New Port' button, the first page to add VPort is a brief introduction page. Click 'Next>' to continue the installation. 'Name the VPort' page will show up. User has to give the port a name. If the name user entered exists as a port name, a message box below will show up to prompt user to give another name. The port name should be less than 63 characters. The port name should not consist of character '\', '*', '/' and ','.

After user gives a valid port name, click 'Next>', a 'Select Print Option' page will show up. We have three print options for the port: (1) Spool without printing: The print job will be spooled and saved to specified spool folder. Then do nothing else. The job will be hold in the folder without being printed. (2) Spool and print immediately: The print job will be spooled and saved to specified spool folder. Then the print job will be immediately sent to the printers of this port to print. (3) Spool and print at scheduled time: The print job will be spooled and saved to specified spool folder. Then the print job will be sent to the printers to print at specified time. The scheduled jobs can only be printed from SpoolCenter. From the view of the port monitor, this option is same as 'Spool only without printing'.

The default print option is 'Spool only without printing'. If the print option needs to be changed, just select the one of the three options. If 'Spool and print at scheduled time' option is selected, you have to specify a future time to print jobs. Besides specifying a future date and time, you have to specify the print frequency. You can specify to print jobs at every 1-6 days, weeks or months. When 'Print only new jobs in the queue' is selected, only the jobs that were scheduled for printing during the most recent printing cycle will be printed. When it is cleared, jobs scheduled during all printing cycles will be printed.

After choosing a print option, click Next to continue. 'Spool File Folder' Page will show up for user to enter or select a folder name to save the print job file. If the folder is not the default one and the folder does not exist, a message box will show up to prompt user to create the folder or not. If Yes is click, the folder is created and used as the spool folder. Otherwise, user has to enter or select another folder to spool the jobs. If the folder is used by other VPort, another message box will show up to prompt user. Another folder has to entered and selected. It does not allow to use the same spool folder for two different SpoolCenter ports. User also can click the 'Browse . . . ' button to select a folder name from 'Browse for Folder' dialog box. After enter or select a valid spool folder, click Next to continue. 'Select the Printers' Page will show up.

All printers whose port is not a VPort will be listed in the page. VPort can not forward a print job to another printer with VPort to avoid that the print jobs are send back and forth between printers endlessly. Check the check box on the left of the printer name if you want the jobs to be forwarded to that printer. Please notice that highlighting a row or multiple rows in the printer list does not mean they will be used by the port. Highlighting printers is used to change the order of the printers in the list. The printers used by the port have the order. The printers selected in the printer list should have different print port, because a general port can only be connected to only one physical printer. If multiple printers with the same port are selected, an error message box will show up.

The printers in the list have priorities when applying distribution. The first printer has the highest priority and last printer has the lowest priority. When the job is not PS format or not page-independent PS, while applying cluster printing policy, the job will be forwarded to the first printer since the job can not be split page by page. To change the order of printer in the printer list, just highlight the printer and use Move Up and Move Down buttons to move the highlighted printer up and down. You might press Ctrl+Click to select multiple printers to move them together. In this version, the number of printers selected is limited to 3. If there are more than 3 printers are selected, an error message will pop up. You have to uncheck some printers. After selecting the printers for the port, click Next. Then the 'Set Print Policy' page shows up.

A print policy has to be specified for this port to indicate how the job will be distributed and printed to the cluster printers. In an embodiment of the present invention, there are four print policies: Direct printing, Tandem printing, Broadcast printing and Cluster printing. Tandem printing and Cluster printing policies are page-based and require PostScript parser to analyze the PS job and cut it into small pieces and print them. In an embodiment of the present invention, there are only PostScript parser only jobs in PS format can apply these two print policies. Other format jobs can not use Tandem printing and Cluster printing to redistribute. Direct printing and Broadcast printing policy are job-based. They can be applied to the jobs in any formats. Tandem Printing policy and Cluster Printing policy are always available in VPort configuration if there are multiple printers in the VPort printer group no matter whether the virtual printers using the VPort are set to KPDL or PCL/XL. That is because the VPort could be used by multiple virtual printers. It is users' choice to use which print policy. Also when the VPort is created or configured, the port monitor may have no idea about which printer will use the VPort.

Figure 4:
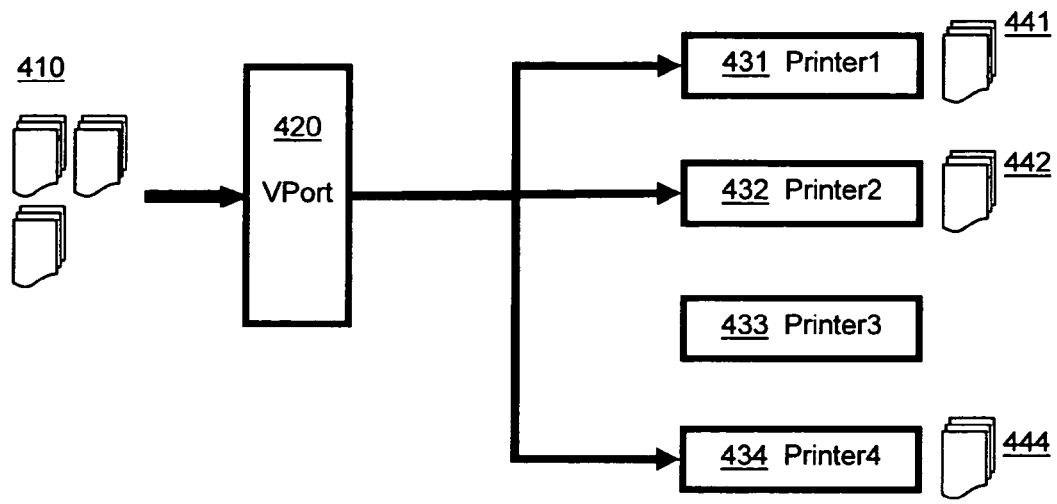
FIG. 4 is a block diagram showing Tandem printing policy, in accordance with a preferred embodiment of the present invention.

FIG. 4 is a block diagram showing Tandem printing policy, in accordance with a preferred embodiment of the present invention. When user prints multiple copies 410 of the job through application, by using this policy the job will be distributed to each printer of the cluster printers with the same number of copies 441, 442, 444. The total number of copies of the job is same as the number the user requires. In the example in FIG. 4, three physical printers 431, 432, 434 are associated with the VPort 420. Printer3 433 is not associated with the VPort 420.

Figure 5:
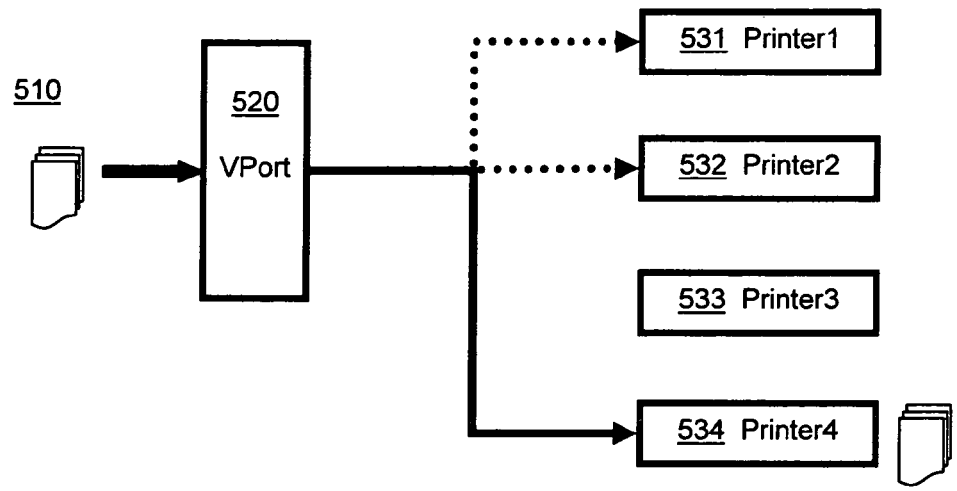
FIG. 5 is a block diagram showing Direct printing policy, in accordance with a preferred embodiment of the present invention.

FIG. 5 is a block diagram showing Direct printing policy, in accordance with a preferred embodiment of the present invention. For special purpose, user can specify the job to be only printed on a specified physical printer 534 in the cluster printer list. Direct printing will directly forward the job to the specified printer 534 for printing.

Figure 6:
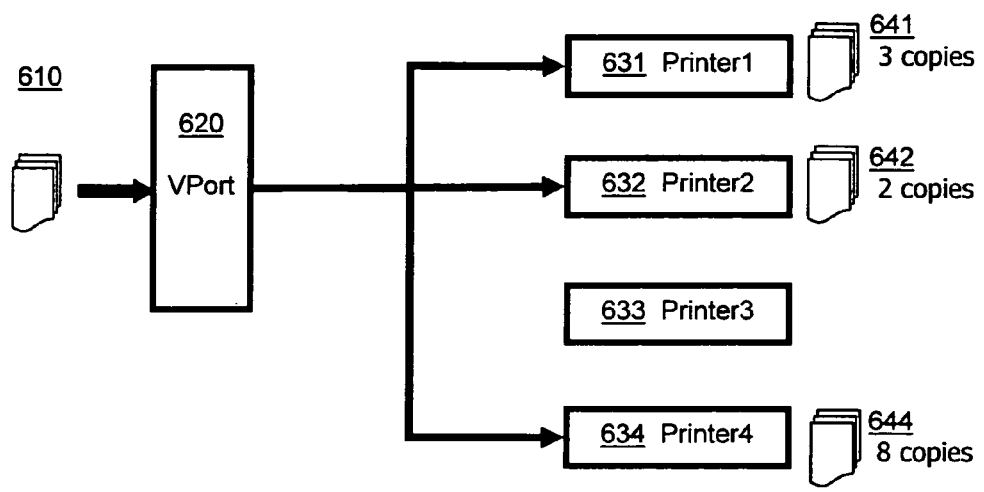
FIG. 6 is a block diagram showing Broadcast printing policy, in accordance with a preferred embodiment of the present invention.

FIG. 6 is a block diagram showing Broadcast printing policy, in accordance with a preferred embodiment of the present invention. User can multiply the job received 610 and send the specified copies of the jobs to the printers in the cluster. When the Broadcast printing policy is selected, the button 'Settings' will be enabled. Click Settings to specify the number of copies for each printer as below. The default setting is one copy for each printer. The number of copies can be changed according to the requirement. If the number for a printer is changed to 0, the job will not be printed at that printer. If 'Apply copy count to all printers' is checked, when the copy number for a printer is changed the copy numbers for other printers will be changed to the same number as the current printer.

Figure 7:
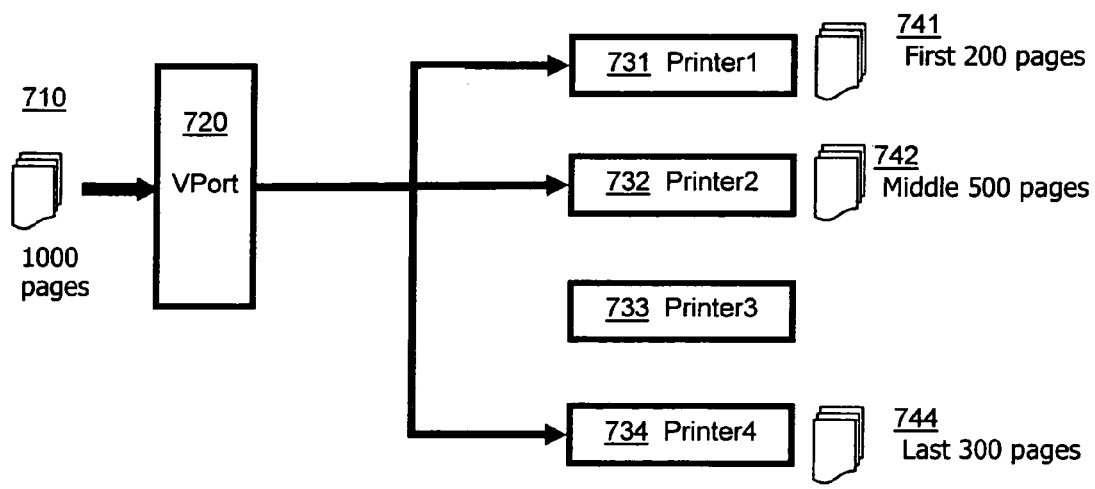
FIG. 7 is a block diagram showing Cluster printing policy, in accordance with a preferred embodiment of the present invention.

FIG. 7 is a block diagram showing Cluster printing policy, in accordance with a preferred embodiment of the present invention. The job will be divided into small pieces according to specified policy and then distribute and print these small pieces to the printers in the list. With 'Optimized by printer speed' the jobs will be distributed according to the speed of printers associated with the VPort. In an embodiment of the present invention, SpoolCenter may have no idea to know the printing speed of printers from some manufacturers. If the printer group of VPort include both printers whose speeds are known and printers whose speeds are unknown, Cluster printing with optimized by printer speed policy may distribute the job to only printers whose speeds are known. With 'Equal pages. distribution' pages of the print jobs will be distributed equally to all printers associated with the VPort. After selecting the print policy for the port, click Next. Then the confirmation page shows up. Then click Finish to complete adding the port. If the operation is successful, the UI just disappears and no more dialog box pops up again.

The Configure Port UI is for configuring the existing VPort. You can change any information of the VPort except its name. The detail instructions to change the respective values can be referred in 'Add Port'. The major UI difference is that Add Port uses wizard style to add a port one page by another with entering single information in one page and Configure Port is to configure single information in each tab in one dialog. Another major UI difference is that Configure Port has more options to configure the behavior of the monitor. But Add Port Wizard just has default values for these options and these options do not have to be configured during adding the port.

We have described all controls on the UI of Spooling Tab in Add Port Wizard except option 'Apply spooling option to all jobs in the queue'. The default of this option is not checked. This option is enabled only when SpoolCenter is running. If SpoolCenter is not started, this option will be disabled. If SpoolCenter is started and the option is checked but Spool- Center is closed before you click OK on the configuration page, this option will be automatically disabled and unchecked. This option is powerful and dangerous. It will overwrite the print options of ALL jobs captured in the VPort. You can not undo the operation after clicking OK. If you choose 'Spool and print immediately' option and apply it to all jobs in the queue, all jobs will be printed immediately to printers according to their print policies. The VPort monitor will save the status of option. That means when you check the option and click OK to apply the print option and next time you open the configuration, the option will be still checked. Without changing anything and you click OK, the print option will be applied to ALL jobs in the queue AGAIN. So be very careful to use this option.

Constraints of Printer Tab in various embodiments of the present invention are described below. If only one printer is selected in Printer Tab, only Direct Printing and Broadcast Printing policies are applicable. If multiple printers are selected all printing policies are applicable.

Constraint 1: If current print policy is Tandem Printing or Cluster Printing, and on Printer Tab only one printer is checked, when you click other tabs or click OK to leave Printer Tab below message box will show up. Click OK, the print policy will be changed to Direct Printing; Click Cancel, the focus will go back to the Printer Tab.

Constraint 2: If current print policy is Direct Printing, and on Printer Tab the printer assigned to Direct Printing has been removed from VPort printer group, when you click other tabs or click OK to leave Printer Tab message box will show up. Click OK, the first printer in the new VPort printer group will be chosen for Direct Printing; Click Cancel, the focus will go back to the Printer Tab.

Constraint 3: If current print policy is Broadcast Printing, and on Printer Tab all printers assigned to Broadcast Printing have been removed from VPort printer group, when you click other tabs or click OK to leave Printer Tab message box will show up. Click OK, the all printers in the new VPort printer group will be chosen for Broadcast Printing with each printer one copy; Click Cancel, the focus will go back to the Printer Tab.

Constraint 4: If current print policy is Broadcast Printing, and on Printer Tab some printers, not all, assigned to Broadcast Printing have been removed from VPort printer group, when you click other tabs or click OK to leave Printer Tab below message box will show up. Click OK, the printers removed from the VPort printer group will also be removed from the Broadcast Printing printer group; Click Cancel, the focus will go back to the Printer Tab.

Constraints of Policy Tab in various embodiments of the present invention are described below. The controls on the Policy Tab UI are same as the ones in Add Port Wizard except option 'Apply print policy to all jobs in the queue'. The default of this option is not checked. This option is enabled only when SpoolCenter is running. If SpoolCenter is not started, this option will be disabled. If SpoolCenter is started and the option is checked but SpoolCenter is closed before you click OK on the configuration page, this option will be automatically disabled and unchecked. As well as option 'Apply spooling option to all jobs in the queue' this option is also powerful and dangerous. It will overwrite the print policy of ALL jobs captured in the VPort. You can not undo the operation after clicking OK. The VPort monitor will save the status of option. That means when you check the option and click OK to apply the print option and next time you open the configuration, the option will be still checked. Without changing anything and you click OK, the print option will be applied to ALL jobs in the queue AGAIN. So be very careful to use this option. Cluster Printing policy is only applicable to jobs with valid and page-independent PS file. Tandem Printing policy is only applicable to the jobs with valid PS file. Direct Printing and Broadcast Printing policies can be applicable to any kind of jobs. Constraint 1: If current print policy is set as Tandem Printing or Cluster Printing, and "Apply policy to all jobs" is checked on Policy Tab, when user clicks OK to close the VPort configure dialog box below message box will show up. Click OK, the print policy will be applied to applicable jobs. For the jobs which are not applicable, their print policy will not be changed; Click Cancel, the focus will go back to the Policy Tab.

Regarding Options Tab, in Add Port Wizard there are not such options for users to set. Add Port Wizard apply the default values for these options. The default value of 'Delete all jobs in the VPort when deleting the VPort' is not checked. The default value of 'Display job distribution message when printing.' is checked. If option 'Delete all jobs in the VPort when deleting the VPort' is checked, when the VPort is to be deleted a confirmation message will popup to ask if all jobs in the VPort will be deleted. If yes, all jobs as well as the log file will be deleted from the VPort. If not, the VPort will be deleted but the jobs still remains in the spool folder. If the option is not checked, when the VPort to deleted the confirmation message will not pop up to ask if all jobs in the VPort will be deleted. The VPort will be deleted but the jobs still remains in the spool folder. If option 'Display job distribution message when printing' is checked, after a job is distributed and sent to the spooler a notification message will be sent to the machine which print the job. If the option is not checked, after distributing there will not be such a notification message sent out. After change the configuration, click OK to save the information. To discard the changes click Cancel button.

If the SpoolCenter port is no long used, it can be deleted. When you delete a port, a confirmation dialog box will show up for you to confirm the deletion. Click Yes, the port will be deleted if it does not be used any printer. If the port is deleted successfully, all PS files under the spool folder still remain. Click No to cancel the deletion. If the port is being used by some printers, it can not be deleted. Below message box will shows up if you try to delete it from Printer Properties. If option 'Delete all jobs in the VPort when deleting the VPort' is checked, when the VPort is to be deleted a confirmation message will popup to ask if all jobs in the VPort will be deleted. If yes, all jobs as well as the log file will be deleted from the VPort. If not, the VPort will be deleted but the jobs still remains in the spool folder. If the option is not checked, when the VPort to be deleted the confirmation message will not pop up to ask if all jobs in the VPort will be deleted. The VPort will be deleted but the jobs still remains in the spool folder.

Figure 8:
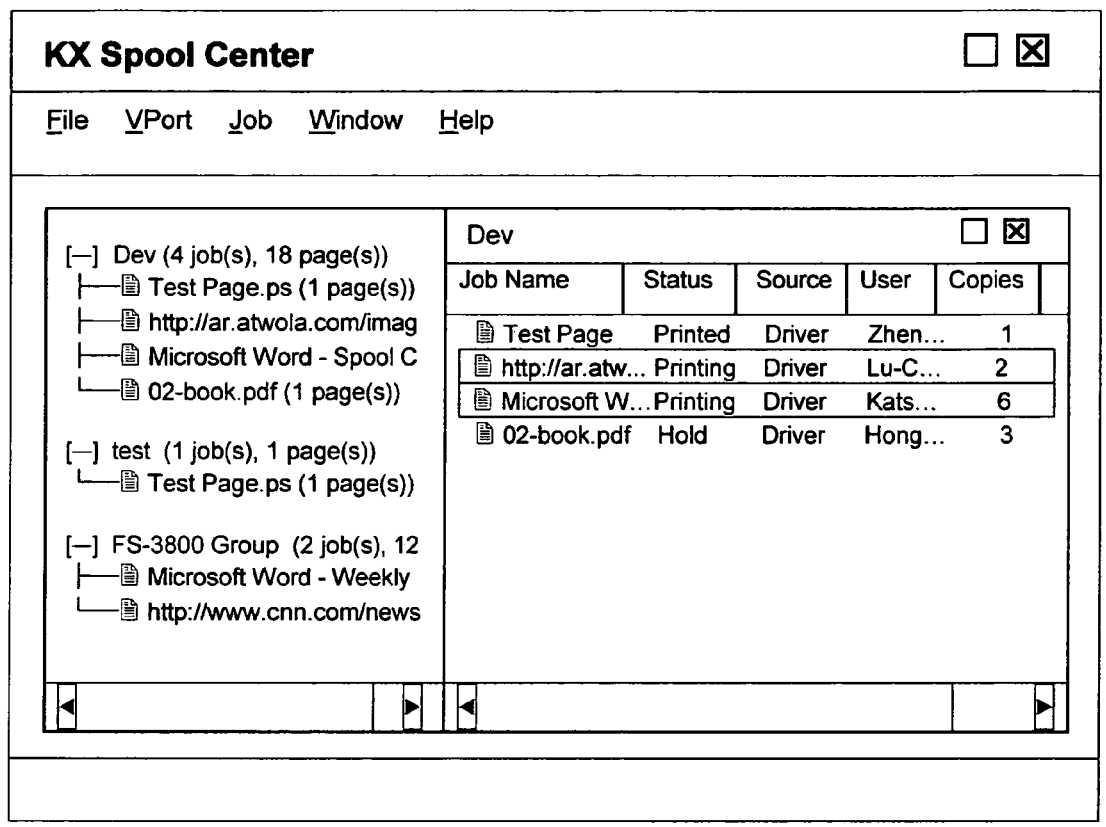
FIG. 8 is a view of the GUI of the SpoolCenter VPort accounting, in accordance with a preferred embodiment of the present invention.

FIG. 8 is a view of the GUI of the SpoolCenter, in accordance with a preferred embodiment of the present invention. Below the title is the menu bar. The left pane is for all VPort and the jobs currently under the VPort. The right pane is for displaying the detail information of the jobs under the specified queue, such as job name, status, document source, owner, number of pages, number of copies, job size and time submitted. In VPort Menu and the GUI, different icons can be used to show different settings for the VPorts: Spool without printing, Spool and print immediately, and Spool and print at scheduled time. Similarly, different icons can be used to show different statuses of the jobs: Held (Hold), Pre-processing, Printed, Printing, and Sheduled.

Various operations on a VPort can be performed by selecting a VPort and using the VPort pull-down menu or by right-clicking on the selected VPort. The VPort menu has some functional submenus: new, open, configure, delete, add SpoolCenter printer, view log, accounting, and properties. The first four submenus are for user to manipulate the VPort. 'Add SpoolCenter Printer' is to create a SpoolCenter printer with current port basing on the existing printer. The next three submenus are to display some information of the VPort. A right-click on a VPort name in the left pane causes a popup menu to show up. They are the operations that can be applied to the VPort at that moment. They are same as the submenus under VPort menu except 'New' submenu. The View Log submenu is to display the latest 64 KB log information of the queue. If the log file of the queue is larger than 64 KB, this operation will just display the last 64 KB log information. See FIG. 3 for a for a portion of a sample log file.

Figure 9:
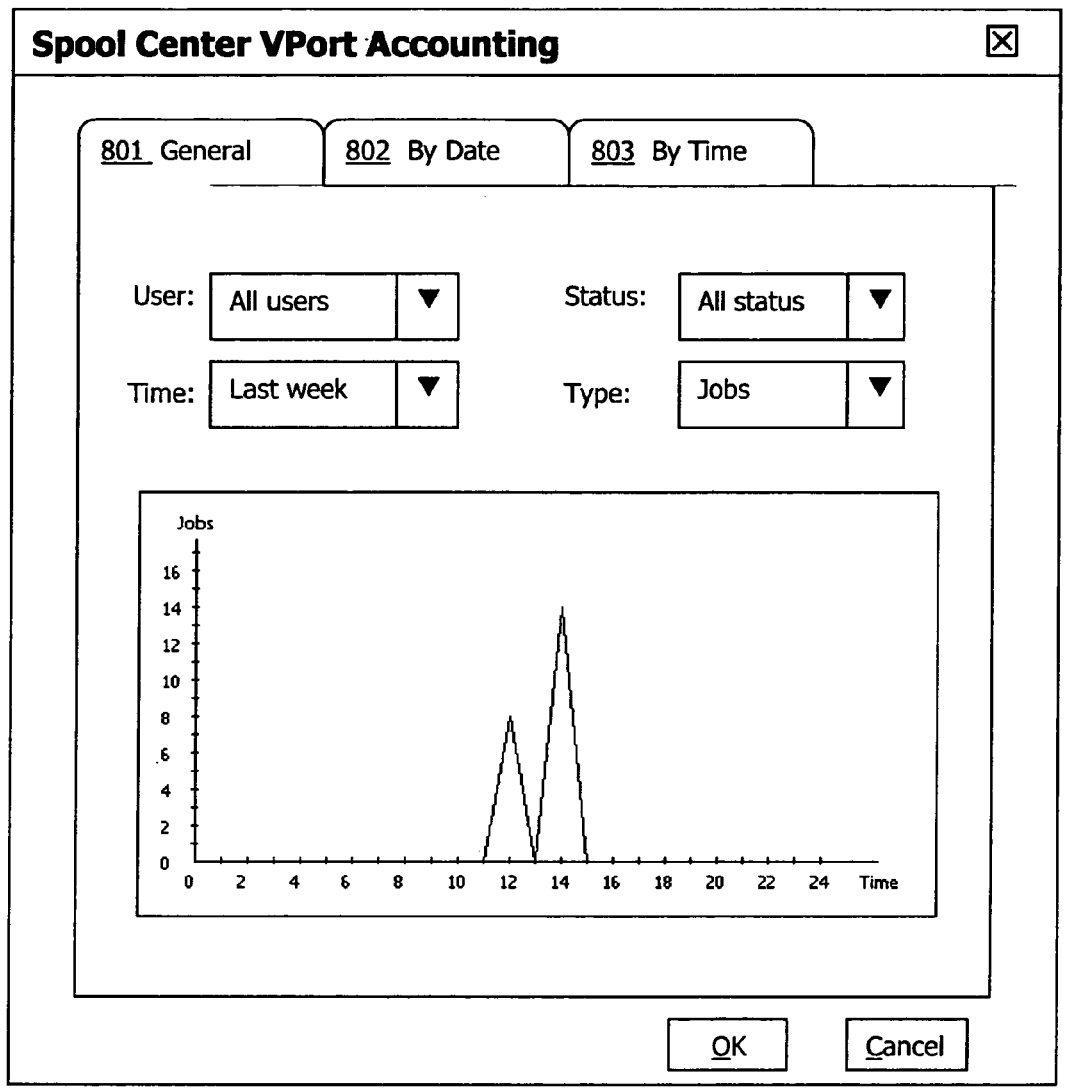
FIG. 9 is a view of the GUI of the SpoolCenter VPort accounting, in accordance with a preferred embodiment of the present invention.

FIG. 9 is a view of the GUI of the SpoolCenter VPort accounting, in accordance with a preferred embodiment of the present invention. Queue accounting gives the end user statistic job information manipulated in the queue. The accounting information has three categories: General, By Date, By Time. General category gives the general jobs information of current queue: the number of jobs and pages in three categories, printed, hold and scheduled. By Date category gives the accounting information by date. This gives who at what timeframe printed/hold/scheduled how many jobs or pages. By Time category gives the accounting information by hours in a day. This gives during 24 hours who at what time frame printed/hold/scheduled how many jobs or pages. Job accounting gives the end user statistic job information of a specified job. The accounting information has three categories: General, LifeTime. General category gives the general jobs information of current queue: the number of times the job was printed, hold and scheduled at a given time frame. Life time category gives the activity information of the job in each day during a give time frame. By Time category gives the accounting information by hours in a day. You can get during 24 hours who at what time frame printed/hold/scheduled how many jobs or pages. Properties information of the specified job, including job name, job file name, status, source, owner, number of pages, size in byte and time submitted.

The Job menu may have some functional submenus: print/reprint, hold, schedule, cut/copy/paste, delete, delete all, select all, accounting, and properties. Print/Reprint menu is used to send the job to SpoolCenter port to print/reprint. If there is only one printer in the VPort cluster printer list, only Direct Printing and Broadcast Printing policies will be enabled. If there are more than one printer in the VPort cluster printer list, there will be submenus for Print/Reprint according to different print policy. To print the document, user can have many choices to determine how the job will be printed.

FIG. 10 is a flowchart showing overall SpoolCenter and VPort processing, in accordance with a preferred embodiment of the present invention. A print job is printed using SpoolCenter and Vport to a physical printer through the following three-step process.

In step 1010, an administrator uses GUI to configure a virtual port (VPort). Each virtual port is associated with one or more physical printers and one or more virtual printers. Each virtual printer in turn is configured from a physical printer. The details of the GUIs involved are described earlier.

In step 1020, a job sent to a virtual printer typically from an application is spooled to the VPort associated with the virtual printer. In an embodiment of the present invention, there are three settings to a virtual port configurable by the user: Spool without printing, Spool and print immediately, and Spool and print at a scheduled time. The details of these three spooling options are described earlier.

In step 1030, an administrator uses GUI to send the spooled print job to the physical printer(s) associated with the virtual port. In an embodiment of the present invention, cluster printing policy comprises: (1) dividing a print job into pieces at page boundaries by applying dividing subpolicies of matching color, paper size, media type, finishing characteristics of the pieces with the corresponding characteristics of the physical printers (where the order of the application of the dividing subpolicies is customizable by an administrator); and (2) sending the pieces to the physical printers by applying sending subpolicies of optimization for fastest printing based on physical printers' speeds, and equal-page distribution. When both of the subpolicies are used, user-customizable weights and preferences can be used to control the degree to which one subpolicy takes precedence over the other subpolicy. In cluster printing, policy, a large 1000-page document may be divided into three pieces and sent to three printers, as in FIG. 7, so that color pages are sent to color printers and the fastest printer receives the most number of pages to achieve the optimal overall performance.

FIG. 11 is a block diagram showing additional SpoolCenter and VPort features, in accordance with a preferred embodiment of the present invention.

Block 1110 represents the features of Pool Printing and Recovery Printing. Both of them require a bidirectional communication connection to the physical printer(s) to monitor their status. SNMP (Simple Network Management Protocol) queries are sent to network printer(s) to check their status. Through the language monitor of the printer driver, PJL (Printer Job Language) commands are sent to local printer(s) to check their status. An administrator uses GUI to send a print job to physical printer(s) associated with the virtual port using Pool Printing policy (wherein a job is sent to the first available and functional printer according to the result of the bidirectional communication) and Recovery Printing policy (wherein, after a printing failure of a job, the job is transferred to an available and functional printer in the queue). Where two or more physical printers are available and functional, a printer can be selected by user-customizable order preference list, or by matching characteristics of the job with the characteristics/capabilities of the printers to find the best match as in Cluster printing policy, Block 1120 represents the feature whereby a user can use GUI to select print job(s) from the print jobs spooled to a virtual port, and enabling Zoom-in and Zoom-out preview of the selected job(s) in separate window(s). Page independence refers to a PostScript file that conforms to the Adobe Document Structuring Conventions (ADSC). Each page of the document will be a self-contained object. This is essential if the PostScript pages are to be extracted and printed on a different printer or previewed out of order. In an embodiment of the present invention, only page independent jobs can be printed through cluster printing policy because the cluster printing will break up the job into small jobs on the base of pages and send these small jobs to multiple printers. That is the reason that the cluster printing requires jobs to be page independent. Page dependence means there are some resources, such as fonts, patterns, or some PS commands, shared among pages, which makes the pages not self-contained. The pages can not be printed or preview out of order.

Block 1130 represents other accounting features in addition to those described in connection with FIG. 9. User can use GUI to select a virtual port and display accounting information comprising general accounting information about status, the number of jobs, number of pages of the print jobs spooled to the virtual port, and by-date and by-time accounting information. See the descriptions accompanying FIG. 9.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although this invention has been largely described using Windows terminology, one skilled in this art could see how the disclosed methods can be used with other operating systems, such as DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for printing to a plurality of printers, comprising:
    providing a GUI for an administrator to configure virtual ports, each of which is associated with at least one physical printer and at least one virtual printer, wherein each of the at least one virtual printer is configured from a physical printer;
    spooling a print job sent to a virtual printer to the virtual port associated with the virtual printer; and
    providing a GUI for the administrator to send the print job to the at least one physical printer associated with the virtual port, and for the administrator to specify a printing policy for sending the print job, which printing policy comprises use of Cluster printing policy comprising
    dividing a print job into pieces at page boundaries by applying dividing subpolicies of matching color, paper size, media type, and finishing characteristics of the pieces with the corresponding characteristics of the at least one physical printer, wherein the order of the application of the dividing subpolicies is customizable by an administrator using GUI; and
    sending the pieces to the at least one physical printer by applying sending subpolicies of optimization for fastest printing based on the speed of the at least one physical printer and distributing equal number of pages to the at least one physical printer.

2. The method of claim 1, wherein spooling of a print job sent to a virtual printer to the virtual port associated with the virtual printer uses spooling options of Spool without printing, Spool and print immediately, and Spool and print at a scheduled time.

3. The method of claim 1, wherein providing a GUI for an administrator to send the print job to the at least one physical printer associated with the virtual port uses Tandem printing policy wherein the same number of copies of the print job are sent to each of the at least one physical printer.

4. The method of claim 1, wherein providing a GUI for an administrator to send the print job to the at least one physical printer associated with the virtual port uses Direct printing policy wherein the print job is sent to user-specified one of the at least one physical printer.

5. The method of claim 1, wherein providing a GUI for an administrator to send the print job to the at least one physical printer associated with the virtual port uses Broadcast printing policy wherein the number of copies specified for each of the at least one physical printer are sent to each of the at least one physical printer.

6. The method of claim 1, wherein providing a GUI for an administrator to send the print job to the at least one physical printer associated with the virtual port uses Cluster printing policy wherein a print job is divided into pieces at page boundaries and sent to the at least one physical printer , wherein upon selection of the option of Optimize by print speed, the pieces of the print job are distributed to the at least one physical printer according to speed of the at least one physical printer associated with the virtual port to optimize print speed.

7. The method of claim 1, further comprising a bidirectional communication connection to the at least one physical printer to monitor status of a network printer through SNMP and to monitor status of a local printer through PJL commands, wherein providing a GUI for an administrator to send the print job to the at least one physical printer associated with the virtual port uses Pool printing policy wherein a print job is sent to the first available and functional printer among the at least one physical printer and Recovery printing policy wherein upon a printing failure during processing of a print job, the print job is transferred to an available and functional printer among the at least one physical printer.

8. The method of claim 1, further comprising a GUI for selecting at least one print job from the print jobs spooled to the virtual port and enabling Zoom-in and Zoom-out preview of the selected at least one print job in separate at least one display window.

9. The method of claim 1, further comprising GUI for selecting a virtual port and displaying accounting information comprising general accounting information regarding status, the number of jobs, and the number of pages of the print jobs spooled to the virtual port, and by-date and by-time accounting information.

10. A computer program product stored on computer-readable medium for printing to a plurality of printers, comprising machine-readable code for causing a machine to perform the method steps of:
    providing a GUI for an administrator to configure virtual ports, each of which is associated with at least one physical printer and at least one virtual printer, wherein each of the at least one virtual printer is configured from a physical printer;
    spooling a print job sent to a virtual printer to the virtual port associated with the virtual printer using a spooling options of Spool without printing, Spool and print immediately, and Spool and print at a scheduled time; and
    providing a GUI for the administrator to send the print job to the at least one physical printer associated with the virtual port, and for the administrator to specify a printing policy for sending the print job, which printing policy comprises use of a method selected from the group consisting of Tandem printing policy wherein the same number of copies of the print job are sent to each of the at least one physical printer; Direct printing policy wherein the print job is sent to user-specified one of the at least one physical printer; Broadcast printing policy wherein the number of copies specified for each of the at least one physical printer are sent to each of the at least one physical printer; Cluster printing policy wherein a print job is divided into pieces at page boundaries and sent to the at least one physical printer; and combinations thereof.

11. The computer program product of claim 10, wherein Cluster printing policy comprises
   dividing a print job into pieces at page boundaries by applying dividing subpolicies of matching color, paper size, media type, and finishing characteristics of the pieces with the corresponding characteristics of the at least one physical printer, wherein the order of the application of the dividing subpolicies is customizable by an administrator using GUI; and
   sending the pieces into the at least one physical printer by applying sending subpolicies of optimization for fastest printing based on the speed of the at least one physical printer and distributing equal number of pages to the at least one physical printer.

12. The computer program product of claim 10, further comprising machine-readable code for causing a machine to perform the method step of providing a bidirectional communication connection to the at least one physical printer to monitor status of a network printer through SNMP and to monitor status of a local printer through PJL commands, wherein providing a GUI for an administrator to send the print job to the at least one physical printer associated with the virtual port uses Pool printing policy wherein a print job is sent to the first available and functional printer among the at least one physical printer and Recovery printing policy wherein upon a printing failure during processing of a print job, the print job is transferred to an available and functional printer among the at least one physical printer.

13. The computer program product of claim 10, further comprising machine-readable code for causing a machine to perform the method steps of:
   providing a GUI for selecting at least one print job from the print jobs spooled to the virtual port and enabling Zoom-in and Zoom-out preview of the selected at least one print job in separate at least one display window; and
   providing a GUI for selecting a virtual port and displaying accounting information comprising general accounting information regarding status, the number of jobs, and the number of pages of the print jobs spooled to the virtual port, and by-date and by-time accounting information.

14. A computing system comprising a print engine, programmed for printing to a plurality of printers, comprising:
   providing a GUI for an administrator to configure virtual ports, each of which is associated with at least one physical printer and at least one virtual printer, wherein each of the at least one virtual printer is configured from a physical printer;
   spooling a print job sent to a virtual printer to the virtual port associated with the virtual printer using spooling options of Spool without printing, Spool and print immediately, and Spool and print at a scheduled time; and
   providing a GUI for the administrator to send the print job to the at least one physical printer associated with the virtual port, and for the administrator to specify a printing policy for sending the print job, which printing policy comprises use of a method selected from the group consisting of Tandem printing policy wherein the same number of copies of the print job are sent to each of the at least one physical printer; Direct printing policy wherein the print job is sent to user-specified one of the at least one physical printer; Broadcast printing policy wherein the number of copies specified for each of the at least one physical printer are sent to each of the at least one physical printer; Cluster printing policy wherein a print job is divided into pieces at page boundaries and sent to the at least one physical printer; and combinations thereof.

15. The computing system of claim 14, wherein Cluster printing policy comprises
   dividing a print job into pieces at page boundaries by applying dividing subpolicies of matching color, paper size, media type, and finishing characteristics of the pieces with the corresponding characteristics of the at least one physical printer, wherein the order of the application of the dividing subpolicies is customizable by an administrator using GUI; and
   sending the pieces into the at least one physical printer by applying sending subpolicies of optimization for fastest printing based on the speed of the at least one physical printer and distributing equal number of pages to the at least one physical printer.

16. The computing system of claim 14, further comprising providing a bidirectional communication connection to the at least one physical printer to monitor status of a network printer through SNMP and to monitor status of a local printer through PJL commands, wherein providing a GUI for an administrator to send the print job to the at least one physical printer associated with the virtual port uses Pool printing policy wherein a print job is sent to the first available and functional printer among the at least one physical printer and Recovery printing policy wherein upon a printing failure during processing of a print job, the print job is transferred to an available and functional printer among the at least one physical printer.

17. The computing system of claim 14, further comprising machine-readable code for causing a machine to perform the method steps of:
   providing a GUI for selecting at least one print job from the print jobs spooled to the virtual port and enabling Zoom-in and Zoom-out preview of the selected at least one print job in separate at least one display window; and
   providing a GUI for selecting a virtual port and displaying accounting information comprising general accounting information regarding status, the number of jobs, and the number of pages of the print jobs spooled to the virtual port, and by-date and by-time accounting information.

* * * * *